United States Patent [19]

Foster

[11] Patent Number: 4,969,387
[45] Date of Patent: Nov. 13, 1990

[54] HYDRAULIC DRIVE UNIT WITH SINGLE PISTON ROD AND PLURAL CYLINDER BODIES

[76] Inventor: Raymond K. Foster, P.O. Box 1, Madras, Oreg. 97741

[21] Appl. No.: 393,670

[22] Filed: Aug. 14, 1989

Related U.S. Application Data

[63] Continuation-in-part of Ser. No. 333,136, Apr. 3, 1989, which is a continuation-in-part of Ser. No. 189,540, May 3, 1988, Pat. No. 4,817,783.

[51] Int. Cl.$^5$ .............................................. F01B 15/00
[52] U.S. Cl. ..................... 91/176; 91/216 R; 91/525; 91/196; 92/117 R; 92/66
[58] Field of Search ............ 91/167 R, 176, 206, 91/211, 214, 216 R, 508, 525, 536, 532, 196; 92/117 R, 117 A, 66, 51, 52, 53

[56] References Cited

U.S. PATENT DOCUMENTS

| | | | |
|---|---|---|---|
| 2,851,994 | 9/1958 | Fagge | 92/111 |
| 2,851,999 | 9/1958 | Kratz | 121/64 |
| 3,097,572 | 7/1963 | Macy | 92/13 |
| 3,152,522 | 10/1964 | Burden et al. | 92/112 |
| 3,202,062 | 8/1965 | Burden | 92/85 |
| 3,240,041 | 3/1966 | Lucke | 72/12 |
| 3,485,141 | 12/1969 | Ott et al. | 92/111 |
| 3,554,088 | 1/1971 | Bruyn | 92/111 |
| 3,783,620 | 1/1974 | Moe | 60/547 |
| 3,905,290 | 9/1975 | Caughey | 100/215 |
| 3,913,457 | 10/1975 | Hawley | 92/66 |
| 4,137,828 | 2/1979 | Senn | 92/117 R |
| 4,143,760 | 3/1979 | Hallstrom | 198/750 |
| 4,726,283 | 2/1988 | Miyamoto | 92/110 |
| 4,793,469 | 12/1988 | Foster | 198/750 |

FOREIGN PATENT DOCUMENTS

| | | | |
|---|---|---|---|
| 2723629 | 12/1977 | Fed. Rep. of Germany | 91/216 R |
| 0086210 | 7/1981 | Japan | 92/117 A |
| 0730563 | 4/1980 | U.S.S.R. | 91/216 R |
| 2032533 | 5/1980 | United Kingdom | 91/216 B |

Primary Examiner—Edward K. Look
Assistant Examiner—Thomas Denion
Attorney, Agent, or Firm—Delbert J. Barnard

[57] ABSTRACT

A plurality of piston heads (P1, P2, P3) are spaced apart along the length of a single piston rod (R). A separate traveling cylinder body (CB1, CB2, CB3) is associated with each piston head (P1, P2, P3). The traveling cylinders bodies (CB1, CB2, CB3) and the piston heads (P1, P2, P3) define first fluid chambers (1A, 2A, 3A) on a common side of the piston heads (P1, P3, P3) and a set of second fluid chambers (1B, 2B, 3B) on a common opposite side of the piston heads (P1, P2, P3). A separate fluid supply and return passageway is provided within the piston rod (R) for each of the working chambers (1A, 1B, 2A, 2B, 3A, 3B). Center members (C1, C2, C3) are secured within the hollow interior of the piston rod (R) and serve to divide the hollow interior into four axial sections (122, 124, 126, 128). The piston rod (R) includes first and second end members (RE1, RE2). The first end member (RE1) includes outer end ports (P1A, P1B, P2A) for the fluid delivery and return passageways for three of the working chambers (1A, 1B, 2A). End member (RE2) includes outer end ports (P2B, P3A, P3B) for the fluid delivery and return passageways for the remaining three working chambers (2B, 3A, 3B). The fluid delivery and return passageways are defined in part by concentric tubes (118, 120, 70, 66) located within piston rod (R) and the inner spacces (122, 124, 126, 128). The control system for transmitting fluid pressure to and from the working chambers (1A, 1B, 2A, 2B, 3A, 3B) includes sequencing valves which are separate units from the piston rod (R), the piston heads (P1, P2, P3) and the cylinder bodies (CB1, CB2, CB3). The sequencing valves are positioned to control the delivery of pressure fluid into the working chambers (1A, 1B, 2A, 2B, 3A, 3B).

21 Claims, 14 Drawing Sheets

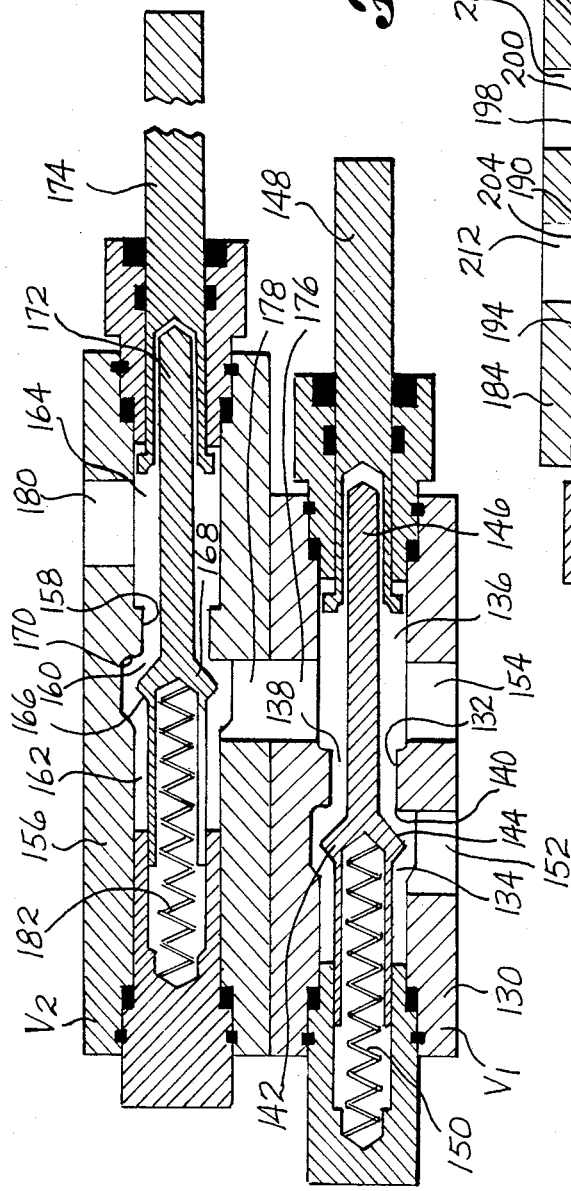
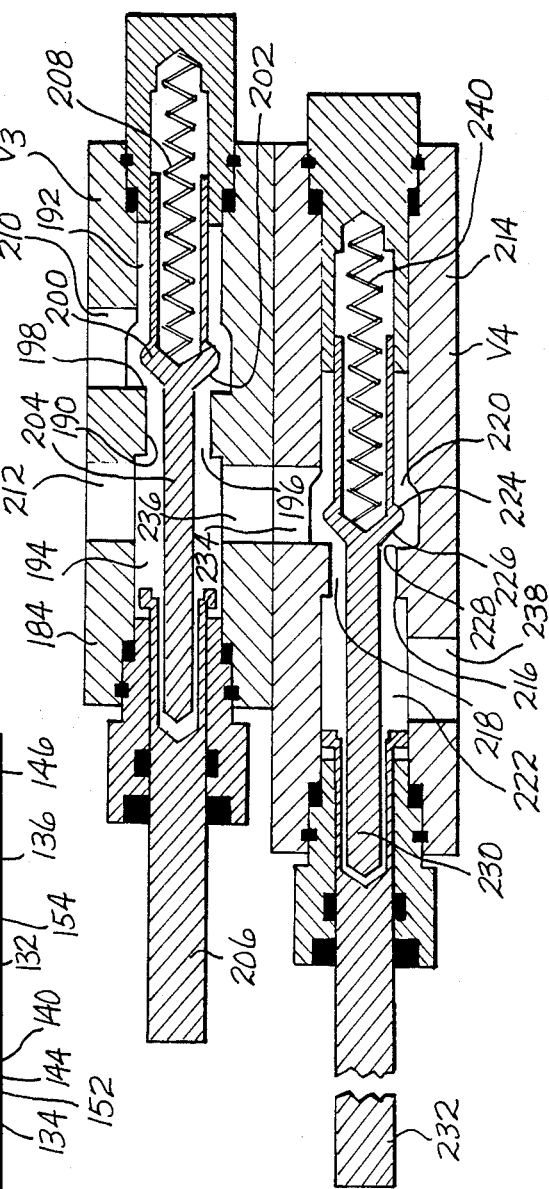

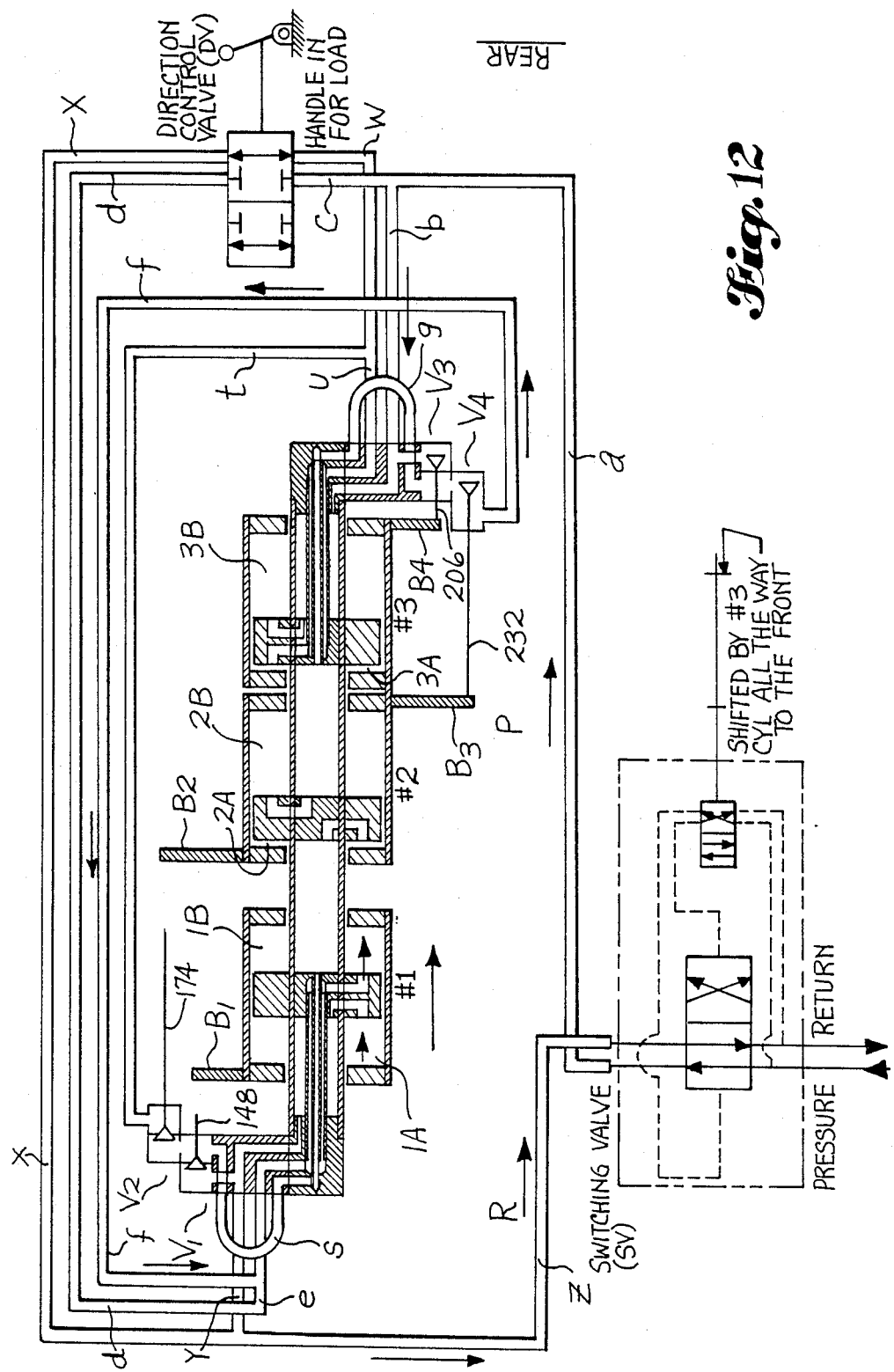

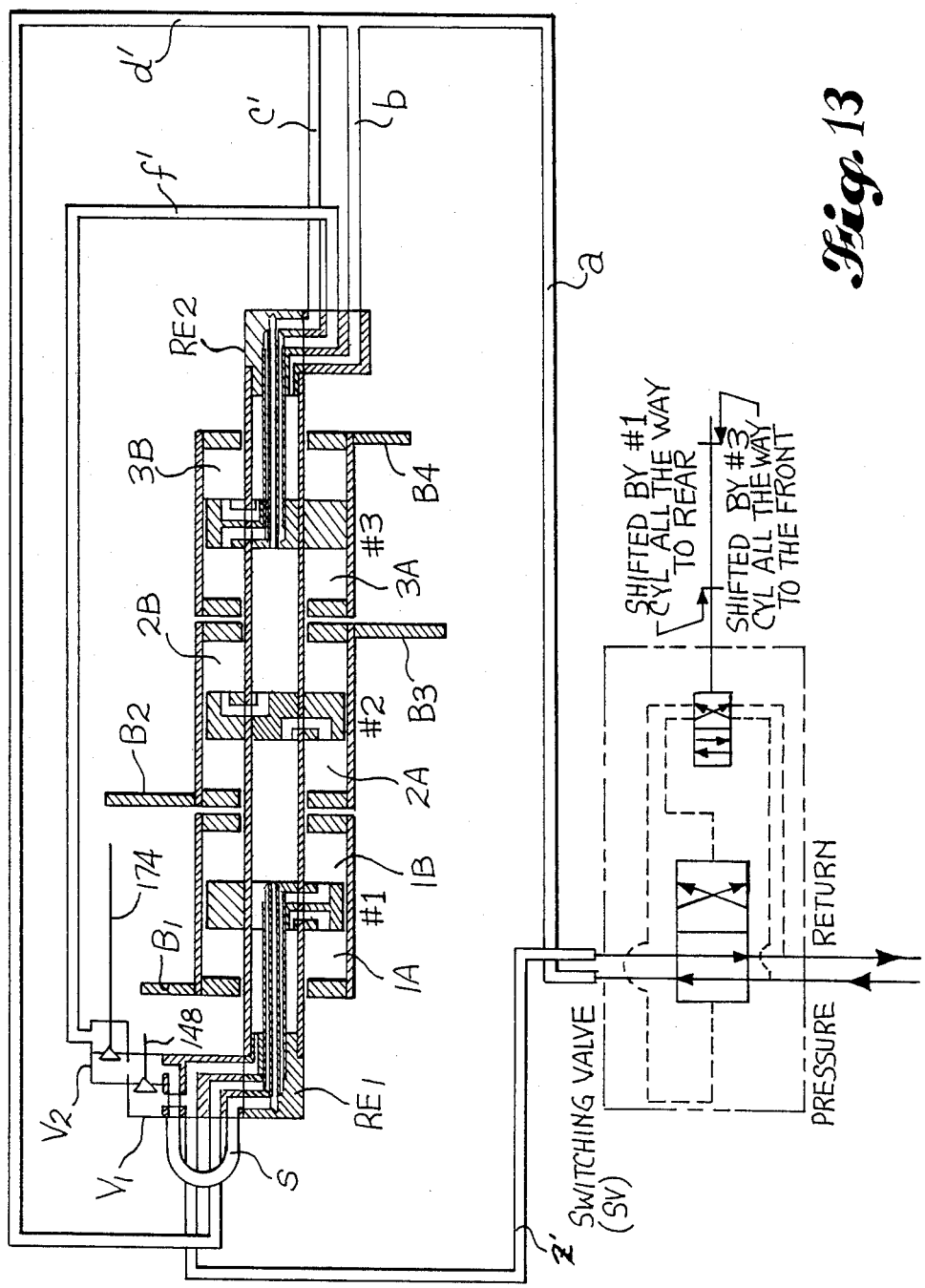

HYDRAULIC DRIVE UNIT WITH SINGLE PISTON ROD AND PLURAL CYLINDER BODIES

RELATED APPLICATION

This application is a continuation-in-part of my copending application Ser. No. 07/333,136, entitled Multi-section Hydraulic Drive Unit With Single Piston Rod, filed Apr. 3, 1989, as a continuation-in-part of my earlier application Ser. No. 189,540, filed May 3, 1988, entitled Single Piston Rod Hydraulic Drive, and now U.S. Pat. No. 4,817,783, granted Apr. 4, 1989.

TECHNICAL FIELD

This invention relates to hydraulic drive units. More particularly, it relates to the provision of a simplified hydraulic drive unit comprising a plurality of movable cylinder bodies on a single piston rod, and to a hydraulic control system for such drive unit.

BACKGROUND ART

As stated in my aforementioned application Ser. No. 07/333,136, there is a need for a compact hydraulic drive unit composed of three or more reversible drive sections which have the capability of being moved either in unison or separately. One use for such a compact drive unit is for powering the floor members of a reciprocating floor conveyor.

Basically considered, a reciprocating floor conveyor comprises at least one group of at least three elongated floor members and a hydraulic drive system which operates to drive at least a majority of the floor members in unison in the desired conveying direction, and to retract them individually. Systems are in use in which all of the floor members are driven in unison, in the desired conveying direction, and are then individually retracted sequentially. It has also been proposed to drive a majority of the floor members in the desired conveying direction while at the same time retracting the remaining floor slat members. The present invention has application to both types of systems.

For background purposes, reference is made to my aforementioned U.S. Pat. No. 4,817,783, to my U.S. Pat. No. 4,793,469, granted Dec. 27, 1988, and entitled Reduced Size Drive/Frame Assembly For A Reciprocating Floor Conveyor, to my U.S. Pat. No. 4,821,868, granted Apr. 18, 1989, and entitled Drive/Frame Assembly for a Reciprocating Floor, and all of the prior art that is disclosed in such patents.

A principal object of the present invention is to provide a hydraulic drive unit of the general type disclosed by my aforementioned Pat. No. 4,817,783 which is of a simplified construction and is capable of being controlled by valves which are separate from the piston rod and the cylinder bodies. A second object of the invention is to provide an improved and simplified control system for the hydraulic drive unit of the invention.

The contents of my aforementioned U.S. Pat. No. 4,817,783 and my copending application Ser. No. 07/333,136 are both hereby fully incorporated by reference into the subject disclosure.

DISCLOSURE OF THE INVENTION

Basically considered, a hydraulic drive unit constructed according to the present invention comprises an elongated piston rod having first and second ends. A plurality of piston heads are spaced apart along the piston rod and are fixed in position on the piston rod. A cylinder body is provided for each piston head. Each cylinder body is mounted to reciprocate back and forth on the piston rod, relative to its piston head. Each piston body and its piston head together define first and second variable volume fluid chambers, separated by the piston head. The first chambers are all located on a common side of the piston heads. The second fluid chambers are all located on the opposite sides of the piston heads. The piston rod includes a separate fluid delivery and return passageway for each variable volume fluid chamber. Each passageway extends between an outer port which is at one end of the piston rod, through the piston rod to an inner port communicating with its variable volume fluid chamber.

In preferred form, the drive unit comprises three piston heads and three cylinder bodies. The piston heads and the cylinder bodies define cylinder sections 1, 2 and 3, positioned in that order between the first and second ends of the piston rod. Cylinder section 1 comprises piston head 1 and cylinder body 1, cylinder section 2 comprises piston head 2 and cylinder body 2 and cylinder section 3 comprises piston head 3 and cylinder body 3. Cylinder section 1 includes variable volume chamber 1A on the side of its piston head closest to the first end of the piston rod. It further includes variable volume chamber 1B which is on the opposite side of piston head 1. Cylinder section 2 includes a variable volume chamber 2A which is on the side of piston head 2 that is closest to the first end of the piston rod. It also includes a variable volume chamber 2B which is positioned on the second or opposite side of piston head 2. Cylinder section 3 includes a first variable volume chamber 3A which is on the side of piston head 3 that is closest to the first end of the piston rod. It also includes a second variable volume chamber 3B which is on the opposite side of the piston head 3. Thus, there is a total of six variable volume chambers. The separate fluid delivery and return passageways for three of the variable volume chambers extends into the piston from the first end of the piston rod. The separate fluid delivery and return passageways for the remaining three variable volume chambers extend into the piston rod from the second end of the piston rod. In the preferred embodiment, the separate fluid delivery and return passageways for variable volume chambers 1A, 1B, and 2A extend inwardly of the piston rod from the first end of the piston rod. The separate fluid delivery and return passageways for variable volume chambers 2B, 3A and 3B extend inwardly of the piston rod from the second end of the piston rod.

According to the invention, the piston rod may be tubular and may include a hollow interior. The drive unit may comprise a center member for each cylinder section which is positioned substantially radially inwardly of the piston head for the section. The center members divide the hollow interior of the piston rod into four interior spaces. The first space is located outwardly of the center member for cylinder section 1, towards the first end of the piston rod. The second space is between the center members for cylinder sections 1 and 2. The third space is between the center members for cylinder sections 2 and 3. The fourth space is outwardly of the center member for cylinder section 3, towards the second end of the piston rod. The fluid delivery and return passageway for variable volume chamber 2A may extend from the first end of the piston rod into the second space and from said second space to the variable volume chamber 2A. The fluid delivery and return passageway for variable volume chamber 2B may extend from the second end of the piston rod into the third space and from such third space to variable volume chamber 2B.

The piston rod may include a first end member at the first end of the piston rod. The fluid delivery and return passageway for variable volume chamber 2A may comprise a passage tube extending from said first end member to and through the center member for the first cylinder section. The passage tube has an inner end which communicates with the second space. A second tube may concentrically surround the passage tube. The fluid delivery and return passageway for variable volume chamber 1B is defined at least in part by and between these concentric tubes.

The piston rod may include a second end member at the second end of the piston rod. The fluid delivery and return passageway for variable volume chamber 2B may comprise a passage tube extending from the second end member to and through the center member for cylinder section 3. This passage tube has an inner end communicating with the third space. A second tube may concentrically surround this passage tube. The fluid delivery and return passageway for variable volume chamber 3A is defined at least in part by and between these concentric tubes.

The fluid delivery and return passageway for variable volume chamber 1A may comprise a passageway section extending through the first end member for the piston rod to the first space and a passageway section communicating said first space with variable volume chamber 1A. The delivery and return passageway for variable volume chamber 3B may include a passageway section in the second end member for the piston rod, extending to the fourth space, and a passageway section communicating said fourth space with variable volume chamber 3B.

Another aspect of the invention is the provision of a source of hydraulic pressure, a return, line, and delivery and return conduits which are connected to the delivery and return passageways within the piston rod, for delivering fluid pressure into and out from the variable volume chambers. According to this aspect of the invention, control valves are incorporated within the conduits. The piston rod, the piston heads and the cylinder bodies are free of these valves. This results in a construction which makes it easier to assemble and disassemble the various parts of the drive unit and the control system. It makes it easier to service the control valves as they are in their own housings.

The present invention further includes some of the specific details of the disclosed best mode, including the preferred control system. Accordingly, other objects, features and advantages of the invention are hereinafter disclosed as a part of the description of the best mode of the invention.

BRIEF DESCRIPTION OF THE DRAWINGS

In the drawings, like reference numerals are used to designate like parts throughout the several views, and:

FIG. 3 is an enlarged scale sectional view of a valve assembly at a first end of the hydraulic drive unit;

FIG. 4 is a view like FIG. 3, but showing a control valve assembly at the opposite end of the hydraulic drive unit;

FIG. 12 is a view like FIGS. 9-11, but showing retraction of the first cylinder section towards the rear;

FIG. 13 is a view like FIG. 5 but of a one-way system;

BEST MODE FOR CARRYING OUT THE INVENTION

Figure 1:
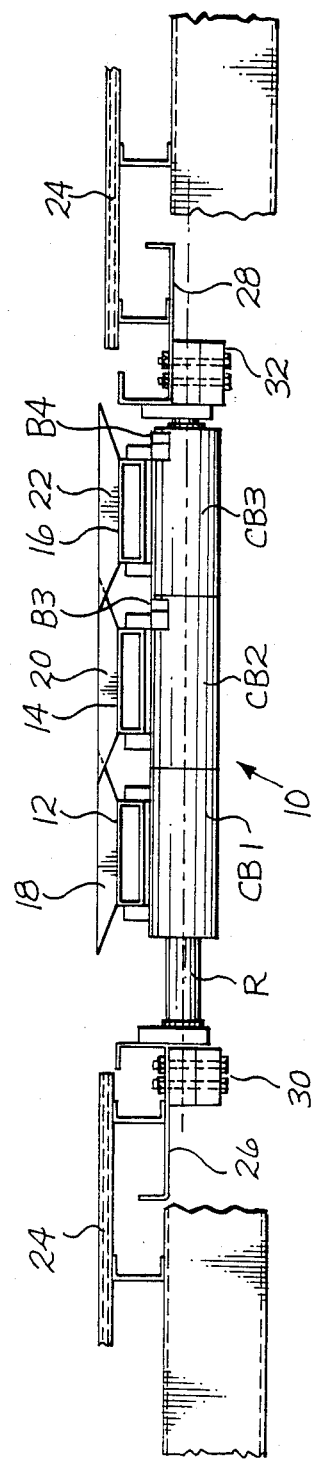
FIG. 1 is a side elevation of a hydraulic drive unit of the present invention, shown incorporated into a reciprocating floor conveyor, with foreground structure omitted for clarity of illustration, and with some parts shown in section.
Figure 2:
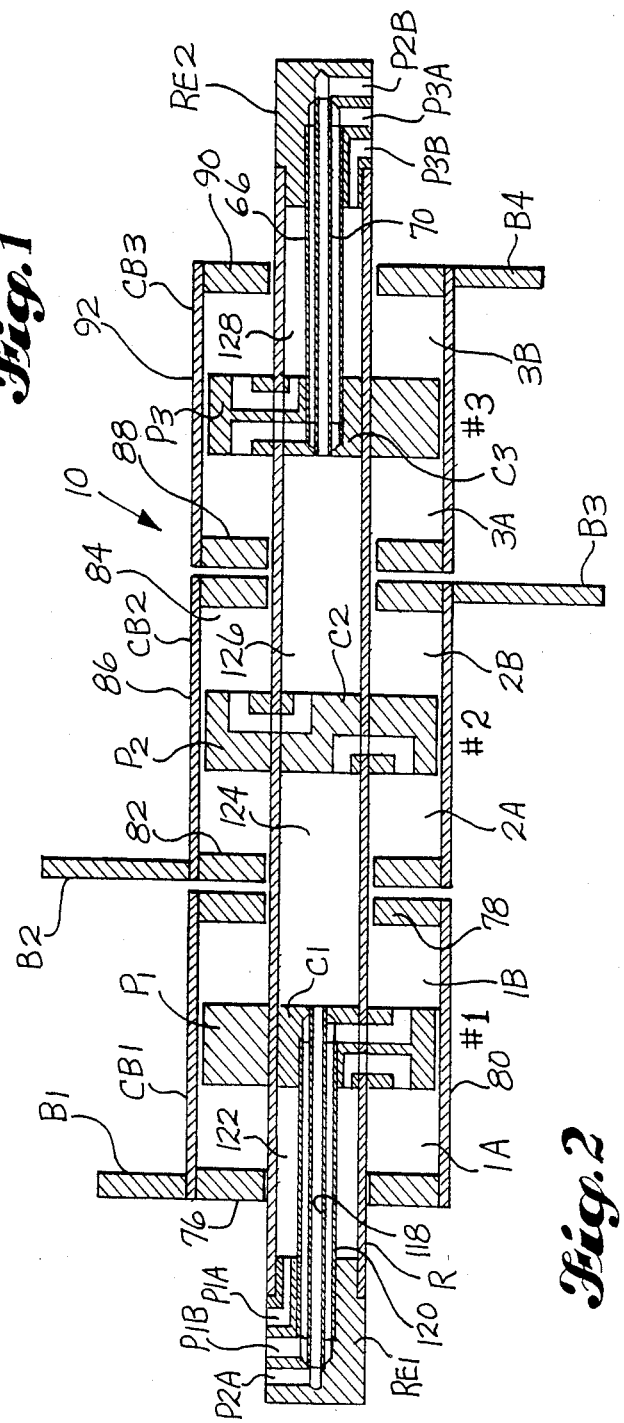
FIG. 2 is an enlarged scale longitudinal sectional view of the hydraulic drive unit of the invention, with some parts shown rather schematically.

FIG. 1 shows a drive unit 10 as a part of a reciprocating floor conveyor. As shown by FIG. 2, the drive unit 10 is basically characterized by an elongated piston rod R, three piston heads P1, P2, P3 secured to the piston rod R, and a like number of cylinder bodies CB1, CB2, CB3, mounted, for back and forth reciprocation on the piston rod R, relative to piston heads P1, P2, P3, respectively.

As shown by FIG. 1, in a reciprocating floor installation, cylinder body CB1 may be connected to a transverse drive beam 12. Cylinder body CB2 may be in like fashion connected to a second transverse drive beam 14. Cylinder body CB3 may be connected in the same manner to a third transverse drive beam 16. The transverse drive beams 12, 14, 16 extend parallel to each other but transversely of the vehicle or other installation in which the reciprocating floor conveyor is installed.

As fully disclosed in my aforementioned U.S. Pat. No. 4,817,783, for example, the transverse drive beams 12, 14, 16 each carry connector elements used to connect floor slat members to the transverse drive beams 12, 14, 16. Drive beam 12 includes connector elements 18 which are spaced apart along its length and are connected to a first set of the floor members. Connectors 20 are spaced apart along the length of transverse drive beam 14 and are connected to a second set of the floor members. Connectors 22 are spaced apart along the length of transverse drive beam 16 and are connected to a third set of the floor members. The floor members are distributed laterally of the installation, and longitudinally of the transverse drive beams 12, 14, 16, in the following manner: there is first a floor member from set 1, then a floor member from set 2 and then a floor member from set 3. Next there is a second floor member from set 1, then a second floor member from set 2, then a second floor member from set 3. This pattern is repeated across the full width of the installation.

As should be evident, linear movement of cylinder body CB1 will cause a lateral movement of drive beam 12 and a longitudinal movement of the first set of floor members. Linear movement of cylinder body CB2 will cause a lateral movement of drive beam 14 and a longitudinal movement of the second set of floor members. Linear movement of cylinder body CB3 will cause a lateral movement of drive beam 16 and a longitudinal movement of the third set of floor members.

The floor members are supported for movement on plastic bearings which are in turn connected to and supported by longitudinal guide beams 24. Portions of guide beams 24 are shown in FIG. 1, but the bearings have been omitted. The arrangement and use of the bearings is now a part of the prior art. They are not a part of the present invention and for that reason they have not been illustrated. A preferred form of floor member bearing is disclosed in my U.S. Pat. No. 4,785,929, granted Nov. 22, 1988, and entitled Bearing System for Reciprocating Floor Conveyor.

In the reciprocating floor installation, the opposite ends of the piston rod R are connected to a pair of short mounting beams 26, 28. The end portions of the piston rod R are received within, or connected to, housings 30, 32 which are bolted to horizontal panel portions of the frame members 26, 28. In this manner, the opposite ends of the piston rod R are fixed in position. The connection of the transverse drive beams 12, 14, 16 directly to the cylinder bodies CB1, CB2, CB3 eliminates a considerable amount of structure and weight that is a part of the earlier developed drive units for reciprocating floor conveyors. This direct connection eliminates push rods, and pivot pin connections which have caused troubles. It further eliminates bearings for the push rods and it results in a quite small and lightweight structure that is capable of transmitting all forces from the floor members to the frame components of the installation. The piston rod R becomes a major component of the immediate support frame for the drive unit 10. The bearings at the opposite ends of the cylinder bodies CB1, CB2, CB3 are spaced apart a considerable distance. They provide a reactive couple to the forces imposed by a yaw-type movement of the transverse drive beams 12, 14, 16. The bearings at the ends of the cylinder body CB1, CB2, CB3 are lubricated by hydraulic fluid and as a result experience very little wear even though they are called upon to transmit forces from the cylinder bodies CB1, CB2, CB3, to the piston rod R. In similar fashion, the connection of the opposite ends of the piston rod R to the support structure creates a reactive couple for all of the bending and sideways forces which are imposed on the piston rod R.

Figure 14A:
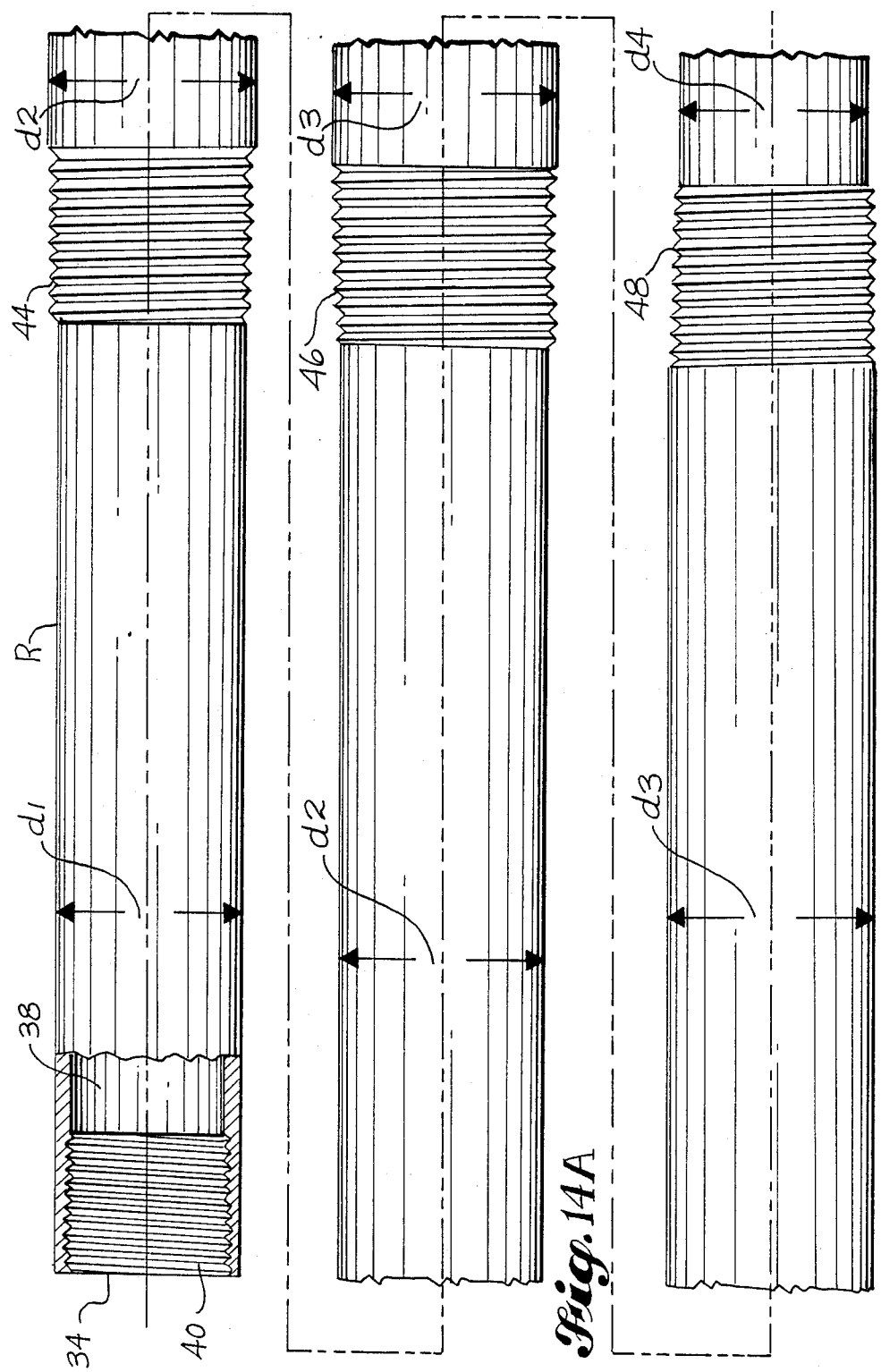
FIG. 14 is an enlarged scale, two part (FIGS. 14A and 14B) view of the piston rod, shown in four segments.
Figure 14B:
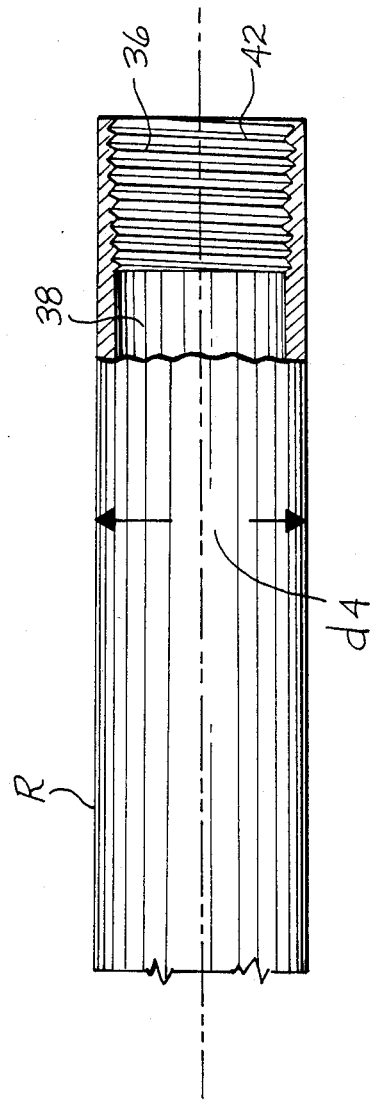

Referring to FIG. 14, in preferred form, the piston rod R is a one-piece tubular member having a first end 34 (FIG. 14A), a second end 36 (FIG. 14B) and a hollow interior 38. The hollow interior 38 may be a continuous center passageway which extends throughout the full length of the tubular member. At the first end 34, the interior of the passageway 38 may be threaded at 40. In like fashion, at the second end 36, the interior of the passageway may be threaded at 42. The threads 40, 42 mate with complementary exterior threads on the inner end portions of the rod end members RE1, RE2 (FIG. 2).

Piston rod R also includes three exterior threaded sections 44, 46, 48, one for each of the piston heads P1, P2, P3. As shown by FIG. 14, the outside diameter of the piston rod R varies in a manner permitting easy installation and removal of annular body portions of the piston heads P1, P2, P3. A first section of the piston rod R, extending from the first end 34 to the first threaded section 44, includes an outside diameter d-1. In its extent between threaded section 44 and threaded section 46, the piston rod R has an outside diameter d-2 which is slightly larger than diameter d-1. In its extent between threaded section 46 and threaded section 48, the piston rod R has a third outside diameter d-3 which is slightly larger than diameter d-2. In its extent between threaded section 48 and the second end 36, the piston rod R has an outside diameter d-4. Diameter d-4 is slightly smaller than diameter d-3. The threads in section 44 are cut into a length of the diameter d-2. In similar fashion, the threads in sections 46, 48 are cut into lengths of the diameter d-3.

The annular body of piston head P2 is slid into place on the piston rod R from the first end 34. It includes a threaded opening through which diameters d-1 and d-2 will fit. The center opening in the annular body for piston head P2 is aligned with the first end 34 of piston rod R and then the annular body is moved along the piston rod R to the threaded section 46. When it reaches the threaded section 46, it is rotated for the purpose of threading it onto the threaded section 46, to in that manner connect it to the piston rod R. The annular body for piston head P includes a threaded center opening which is sized to receive and pass diameter section d-1. Accordingly, following installation of the annular body for piston head P2, the center opening in the annular body for piston head P1 is aligned with end 34 of the piston rod R. Then, this annular body is slid along the first diameter section d-1 to the threaded section 44. The annular body is then rotated for the purpose of threading it onto the threaded section 44 to in that manner connect it to the piston rod R. The annular body for piston head P3 is installed from the second end 36 of the piston rod R. It has a threaded central opening which is sized to freely pass through it the second end portion of piston rod 4, which has a diameter d-4. The annular body of piston head P3 is installed in the same manner as the annular bodies for piston heads P1, P2 except from the opposite end of the piston rod R. That is, the center opening in the annular body for piston head P3 is aligned with the second end 36 of the piston rod R. Then the annular body is slid along the diameter portion d-4 to the threaded section 48. It is then rotated for the purpose of threading it onto the threaded section 48 to in that manner secure it to the piston rod R.

Figure 16:
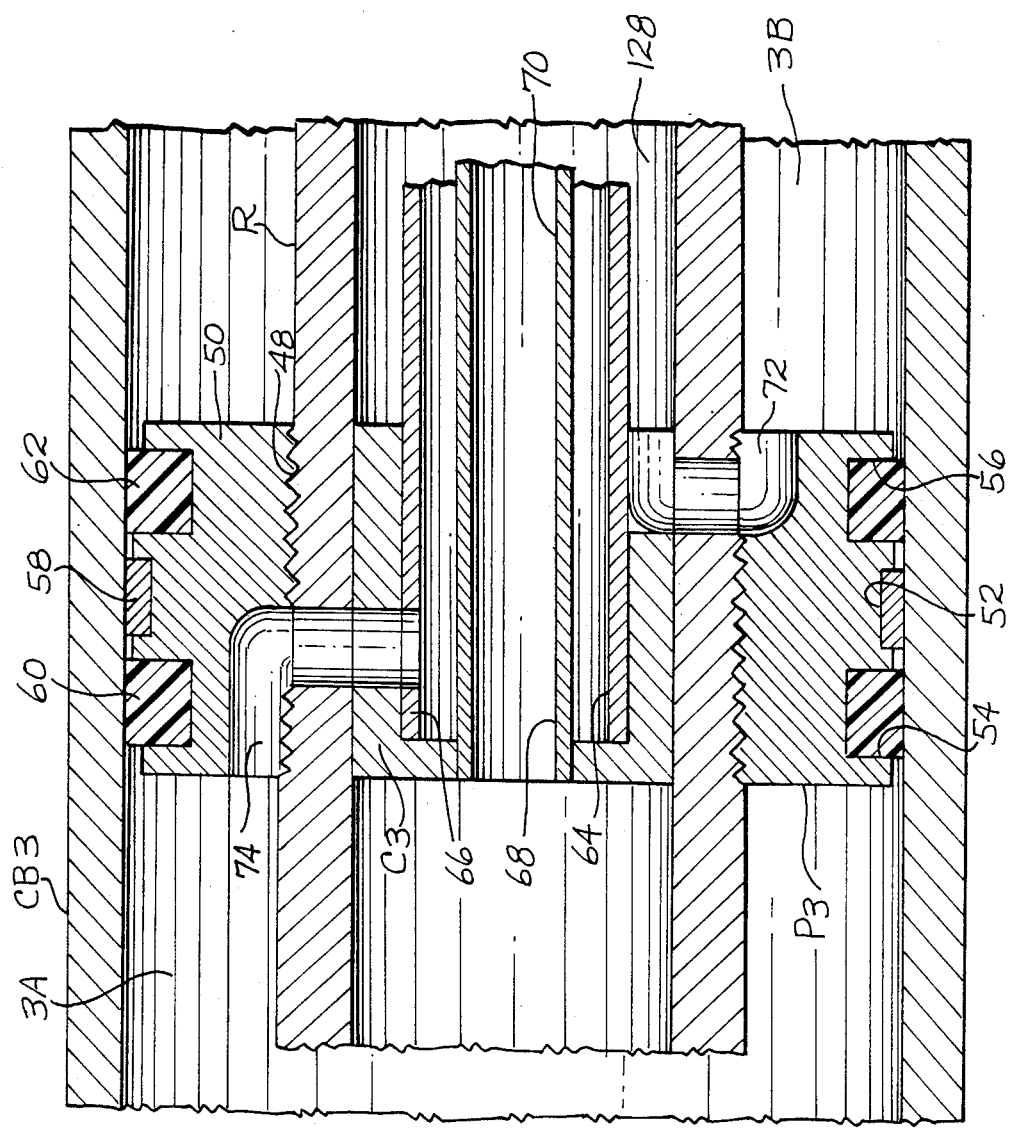
FIG. 16 is a longitudinal sectional view in the region of one of the piston heads.

FIG. 16 is a fragmentary longitudinal sectional view of the hydraulic drive unit 10 in the region of piston head P3. In this view, the annular body portion 50 of piston head P3 is shown to be thread connected to the threaded section 48 on piston rod R. Body 50 is shown to include a central annular groove 52 that is flanked by annular grooves 54, 56. A wear ring 58 is positioned within groove 52. Seal rings 60, 62 are positioned within the grooves 54, 56.

Referring to FIG. 2, each cylinder section 1, 2, 3 includes a center member C1, C2, C3. Center member C3 is shown in FIG. 16 and is typical of the other two center members C1, C2, except for the porting. Each center member C1, C2, C3 is press fit into the cylinder rod R. The cylinder rod R may be heated, to in this manner increase its inner diameter. The center members C1, C2, C3 may be chilled for the purpose of decreasing their diameters. The chilled center members C1, C2, C3 are then rammed into the center of the rod R, into positions substantially radially in line with the piston heads P1, P2, P3. Anchor pins and/or a lock tight composition may be used for securing the center members C1, C2, C3 in position.

As shown by FIG. 16, center member C3 is formed to include a socket 64 sized to receive the inner end portion of a tube or conduit 66. The inner end of center member C3 includes a center opening 68 sized to receive the inner end portion of a passage tube or conduit 70. Radial openings are provided in the sidewall of piston rod R in the vicinity of center member C3. One of these openings communicates with openings in the center member C3 and the piston head P3 to form a fluid avenue 72. The other communicates with openings in center member C3, piston head P3 and tube 66 to define a fluid avenue 74. Avenue 72 is a part of a passageway which connects variable volume chamber 3B with a port P3A that is formed in rod end member RE2. Avenue 74 is a part of a passageway which communicates variable volume chamber 3A with a port P3A in end member RE2. As will be apparent, center member C1 and the conduits and passageways extending between it and end member RE1 are of essentially the same construction as has just been described with respect to center member C3, end member RE2 and the conduits and passageways extending between them. Center member C2 is formed to include avenues which communicate the spaces inside piston rod R, on the opposite sides of center member C2, with avenues in piston head P2 communicating with variable volume chambers 2A, 2B.

Figure 15:
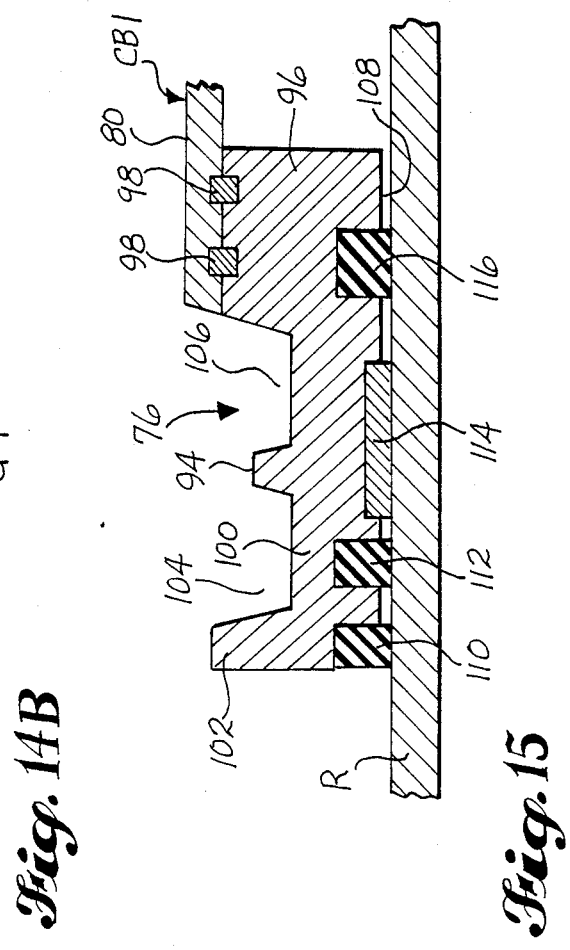
FIG. 15 is an enlarged scale fragmentary sectional view in the region of a cylinder end member at one end of a cylinder body.

Referring to FIG. 2, each cylinder body CB1, CB2, CB3 comprises a pair of opposite end members and an interconnecting cylindrical wall member. The end members and cylindrical wall member for cylinder section CB1 are designated 76, 78 and 80, respectively. The end members and cylindrical wall member for cylinder sections CB2 are designated 82, 84, 86, respectively. The end members and cylindrical wall member for cylinder section CB3 are designated 88, 90 and 92, respectively. FIG. 3 shows a fragmentary part of end member 76 which are preferably identical in construction to end members 82, 88. End members 78, 84, 90 may be of the same construction, or may be minus the center rib 94. Referring to FIG. 15, end member or head 76 comprises an inner end portion 96 which extends into the end of cylindrical 80 of cylinder body CB1. Lock rings 98 may be used for connecting member 76 to member 80. Member 76 includes an outer end portion 100 which projects endwise outwardly from member 80. It may include rings 94, 102 and grooves 104, 106 which define a structure which receives clamp members (not shown) used for connecting the end member 76 to some other structure, such as a transverse drive beam for a reciprocating floor conveyor, for example. The member 76 includes a center opening 108 sized to snugly fit around the piston rod R. The wall of opening 108 includes a plurality of axially spaced apart grooves for receiving annular wiper rings 110, 112, a wear ring 114 and a seal ring 116.

As previously stated, the first end of the piston rod R includes an arrangement of tubes and passageways of the type described above in connection with the second end. At the first end, the smaller diameter inner tube is designated 118. The large diameter tube or conduit is designated 120.

Referring to FIG. 2, cylinder body CB1 and piston head P1 together define a pair of variable volume chambers 1A, 1B. Cylinder body CB2 and piston head P2 together define a pair of variable volume chambers 2A, 2B. In like fashion, cylinder body CB3 and piston head C3 define variable volume chambers 3A, 3B. These chambers 1A, 1B, 2A, 2B, 3A, 3B together constitute the working chambers of the drive unit 10. The chambers which include an "A" designation are all located on a common side of the piston heads P1, P2, P3, i.e. the side directed towards end member RE1. The chambers which include a "B" designation are also located on a common opposite side of the piston heads P1, P2, P3. This happens to be the side which is directed closest to end member RE2.

The center members C1, C2, C3 divide the hollow interior of the piston rod R into spaces 122, 124, 126, 128. As should be evident, these spaces 122, 124, 126, 128 are parts of the system of passageways which are wholly contained within the piston rod R (including the end members), and which commence with the outer end ports P1A, P1B, P2A, P2B, P3A, P3B and extend inwardly to inner ports communicating with the working chambers 1A, 1B, 2A, 2B, 3A, 3B.

Figure 5:
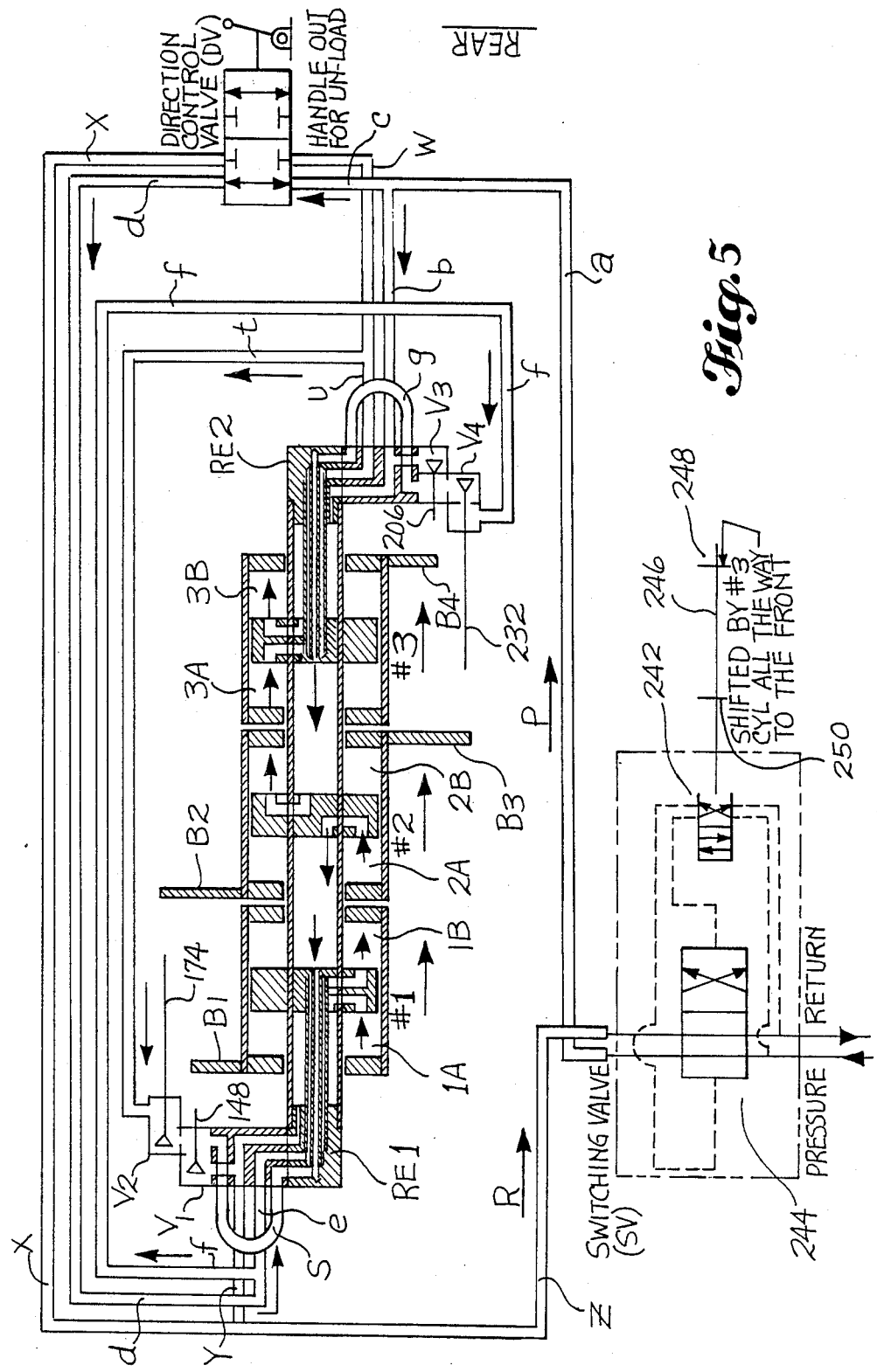
FIG. 5 is a view like FIG. 2, but including a schematic of a two-way hydraulic control circuit, such view showing all three cylinder bodies in the process of moving together towards the rear of the installation, for conveying a load towards the rear.

FIGS. 5-12 illustrate a reversible or two-way control system for the cylinder sections 1, 2, 3. FIG. 13 illustrates a one-way system. Referring to FIG. 5, for example, the two-way system includes a pair of sequencing valves V1, V2 at rod end RE1. It also includes sequencing valves V3, V4 at rod end RE2. In the one-way system (FIG. 13), sequencing valves V1, V2 are provided at rod end RE1, but there are no sequencing valves at rod end RE2.

FIGS. 3 and 4 best illustrate the sequencing valves V1, V2, V3, V4. Valve V1 includes an outer wall or housing 130 and a hollow interior divided by an inner wall 132 into first and second chambers 134, 136. Wall 132 includes an orifice 138. A valve seat 140 is provided at the first chamber end of orifice 138. A valve plug 142 is located within the first chamber 134. It includes a closure surface 144 that is directed towards the valve seat 140. An elongated stem 146 extends from valve plug 142 through the orifice 138 and into the second chamber 136. A mechanical operator 148 is positioned in axial alignment with the valve plug 142, and the stem 146. In the illustrated embodiment, stem 146 and operator 148 are shown to be separate members, with the stem 146 and the valve plug 142 being capable of moving independently of the operator 148. A compression spring 150 serves to normally bias the valve plug 142 towards the orifice 138 and the closure surface 144 into valve closing contact with the valve seat 140.

Housing 130 includes a first port 152 which communicates with the first chamber 134. It also includes a second port 154 which communicates with the second chamber 136. The mechanical operator 148 projects endwise of valve V1 towards a bumper B1 at the end of cylinder body CB1 which is closest to rod end RE1.

Valve V2 comprises a wall or housing 156 and an inner wall 158 which includes an orifice 160. Wall 158 divides the interior of housing 156 into a first chamber 162 and a second chamber 164. A valve plug 166 is positioned within the first chamber 162. It includes a closure surface 168 that is directed towards the orifice 160 and a valve seat 170 at the first chamber end of the orifice 160. Valve plug 166 includes a stem 172 which extends through the orifice 160 into the second chamber 164. A mechanical operator 174 extends in axial alignment with stem 162. In preferred form mechanical operator 174 is separate from stem 172 so that the valve plug 166, including stem 172, can move independently of operator 174. Ports 176, 178 in housings 130, 156, respectively, communicate second chamber 136 of valve V1 with first chamber 162 of valve V2. A port 180 in housing 156 provides an outlet port for the second chamber 164 of valve V2. Valve V2 includes a coil spring 182 which normally biases the closure surface 168 of valve plug 166 into valve closing contact with the valve seat 170. Operator 174 extends towards a bumper B2 at the end of cylinder body CB2 which is closest to rod end RE1.

Referring to FIG. 4, valve V3 includes an outer wall or housing 184 and a hollow interior divided by an inner wall 190 into first and second chambers 192, 194. Wall 190 includes an orifice 196. A valve seat 198 is provided at the first chamber end of orifice 196. A valve plug 200 is located within first chamber 192. It includes a closure surface 202 that is directed towards the valve seat 198. An elongated stem 204 extends from valve plug 200 through the orifice 196 into the second chamber 194. A mechanical operator 206 is positioned in axial alignment with the valve plug 200 and the stem 204. In the illustrated embodiment, stem 200 and operator 206 are shown to be separate members, with the stem 204 and the valve plug 200 being capable of moving independently of the operator 206. A compression spring 208 serves to normally bias the valve plug 200 towards the orifice 190 and the closure surface 202 into valve closing contact with the valve seat 198. Housing 184 includes a first port 210 which communicates with the first chamber 192. It also includes a second port 212 which communicates with the second chamber 194. The mechanical operator 206 projects endwise of valve V3 towards a bumper B4 at the end of cylinder body CB3 which is closest to rod end RE2.

Valve V4 comprises a wall or housing 214 and an inner wall 216 which includes an orifice 218. Wall 216 divides the interior of housing 214 into a first chamber 220 and a second chamber 222. A valve plug 224 is positioned within the first chamber 220. It includes a closure surface 226 which is directed towards a valve seat 228 at the first chamber end of the orifice 218. Valve plug 224 includes a stem 230 which extends through the orifice 218 into the second chamber 222. A mechanical operator 232 extends in axial alignment with stem 230. In preferred form, mechanical operator 232 is separate from stem 230 so that the valve plug 224, including the stem 230, can move independently of operator 232. Ports 234, 236 in housings 214, 184, respectively, communicates second chamber 194 of valve V3 with first chamber 220 of valve V4. A port 238 in housing 214 provides an outlet port for the second chamber 222 of valve V4. Valve V4 includes a coil spring 240 which normally biases the closure surface 226 into valve closing contact with the valve seat 228. Operator 232 extends towards a bumper B3 at an end of cylinder body CB2 which is closest to rod end RE2.

The control system includes a switching valve SV. The control system for a two-way system also includes a direction control valve DV.

Switching valve SV includes a mechanically operated pilot valve section 242 and a main valve section 244. A control rod 246 is connected to the valve spool of the pilot valve 242. Control rod 246 includes a pair of spaced apart bumpers 248, 250 which are positioned to be in the path of contact arms which are carried by either cylinder bodies CB1 and CB3 or the drive beams 12, 16 which are connected to the cylinder bodies CB1, CB2. In the illustrated embodiment, the control arm carried by cylinder body CB3 or its transverse drive beam 16 contacts the bumper 248 at the end of its travel towards the front of the installation. In similar fashion, the control arm carried by cylinder body CB1 or its transverse drive beam 12 contacts the bumper 242 as it reaches the end of its travel towards the rear of the installation. As a comparison of FIGS. 5 and 6 will shown, in this manner the control rod 256 is moved and the direction of pressure and return through the pilot valve 242 is reversed. Main valve 244 includes a flow reversing spool having a fluid chamber at each of its ends. Pilot valve 246 controls the delivery of pressure to and from the opposite ends of the main valve spool. Switching valve SV is shown schematically in the drawing because it is a known form of valve. The actual construction of the valve may be as is disclosed in U.S. Pat. No. 3,530,895, granted Sept. 29, 1970 to Arthur A. Rothrock.

Direction control valve DV may also be termed a "reversing" valve. It includes a mechanically controlled spool which has two positions. In one position it permits flow through a path in the valve DV which is a part of conduit path a-c-d-e-f. In such position it blocks flow through conduit path z-y-x-w-u-t. In its second position, the valve spool of valve DV blocks flow through path a-c-d-e-f while permitting flow through path z-x-w-v-u-t.

Referring to FIG. 5, pilot valve 242 has been shifted by movement of all three of the cylinder bodies CB1, CB2, CB3 to the front of the installation. In the disclosed reciprocating floor installation, this places all of the floor members in a retracted position. In FIG. 5 the valves DV and SV are positioned to direct pressure into working chambers 1B, 2B, 3B, while simultaneously connecting working chambers 1A, 2A, 3A to return. In response, there is a simultaneous movement of all three of the cylinder bodies CB1, CB2, CB3. In a reciprocating floor conveyor, all of the floor members are moved together towards the rear of the installation, for conveying any load that is on them. In response to the three cylinder bodies CB1, CB2, CB3 reaching the end of their travel towards the rear of the installation, pilot valve 242 is moved to in turn cause a movement of main valve 244. Specifically, a control arm carried by the cylinder body CB1, or the transverse drive beam 12 connected to it, contacts bumper 242 as cylinder body CB1 approaches its rear position. This causes a movement of the control rod 246 for moving the slave valve 242 from the position shown in FIG. 5 to the position shown in FIG. 6. This movement of slave valve 242 reverses the application of pressure and return to the spool of main valve 244, causing the main valve spool to move from the position shown by FIG. 5 to the position shown by FIG. 6. This also causes a reversal in the communication of pressure and return to conduit sections a, z. In the position of main valve 244 shown in FIG. 5, pressure is delivered to conduit section a and conduit section z is connected to return. Following movement of the main valve spool into the position shown by FIG. 6, pressure is delivered to conduit path z and conduit path a is connected to return. In FIGS. 5–13 the letter "P" is used to designate the conduit path a or z which is connected to pressure. The letter "R" is used to designate the conduit path a or z which is connected to return.

Figure 6:
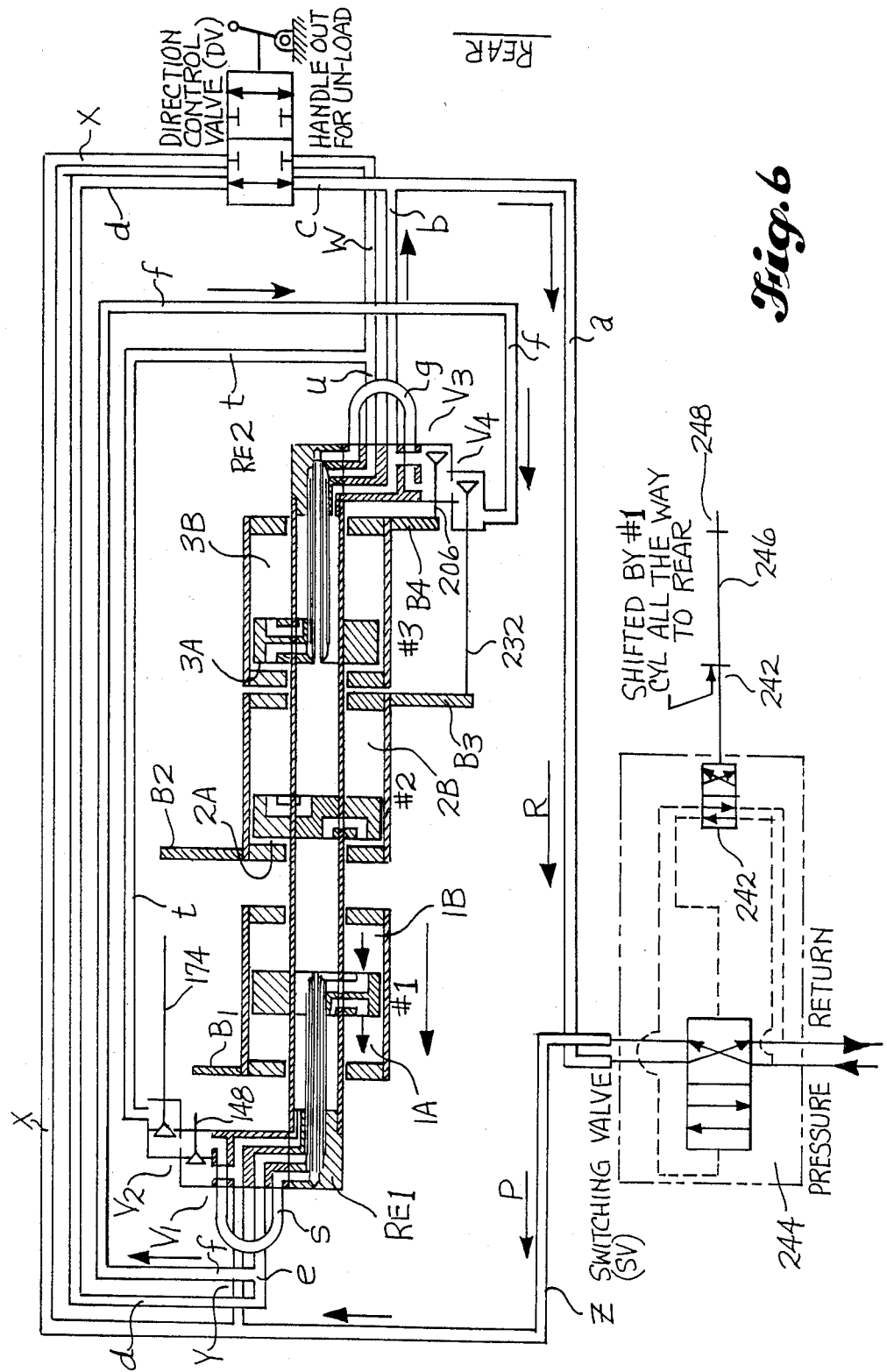
FIG. 6 is a view like FIG. 5, but showing a first of the cylinder bodies in the process of moving from its advanced to its retracted position, and showing the other two cylinder bodies in their advanced positions.

Referring to FIG. 6, following shifting of the switching valve SV, the pressure is communicated via conduit sections z and y to port P1A. This communicates the pressure with the pressure and delivery passageway leading to working chamber 1A. At the same time, working chamber 1B is connected to return via its delivery and return passageway R and by conduit sections e-d-c-a. In response, cylinder body CB1 is moved towards the left, as illustrated, into a retracted or forward position. At the end of the forward movement of cylinder body CB1 the bumper B1 contacts valve operator 148 and it in turn exerts an endwise force on valve stem 146, in opposition to the force of spring 150. The operator 148 and valve stem 146 are moved an amount sufficient to displace the valve plug 142 away from the valve seat 140, into the position shown by FIG. 3.

Figure 7:
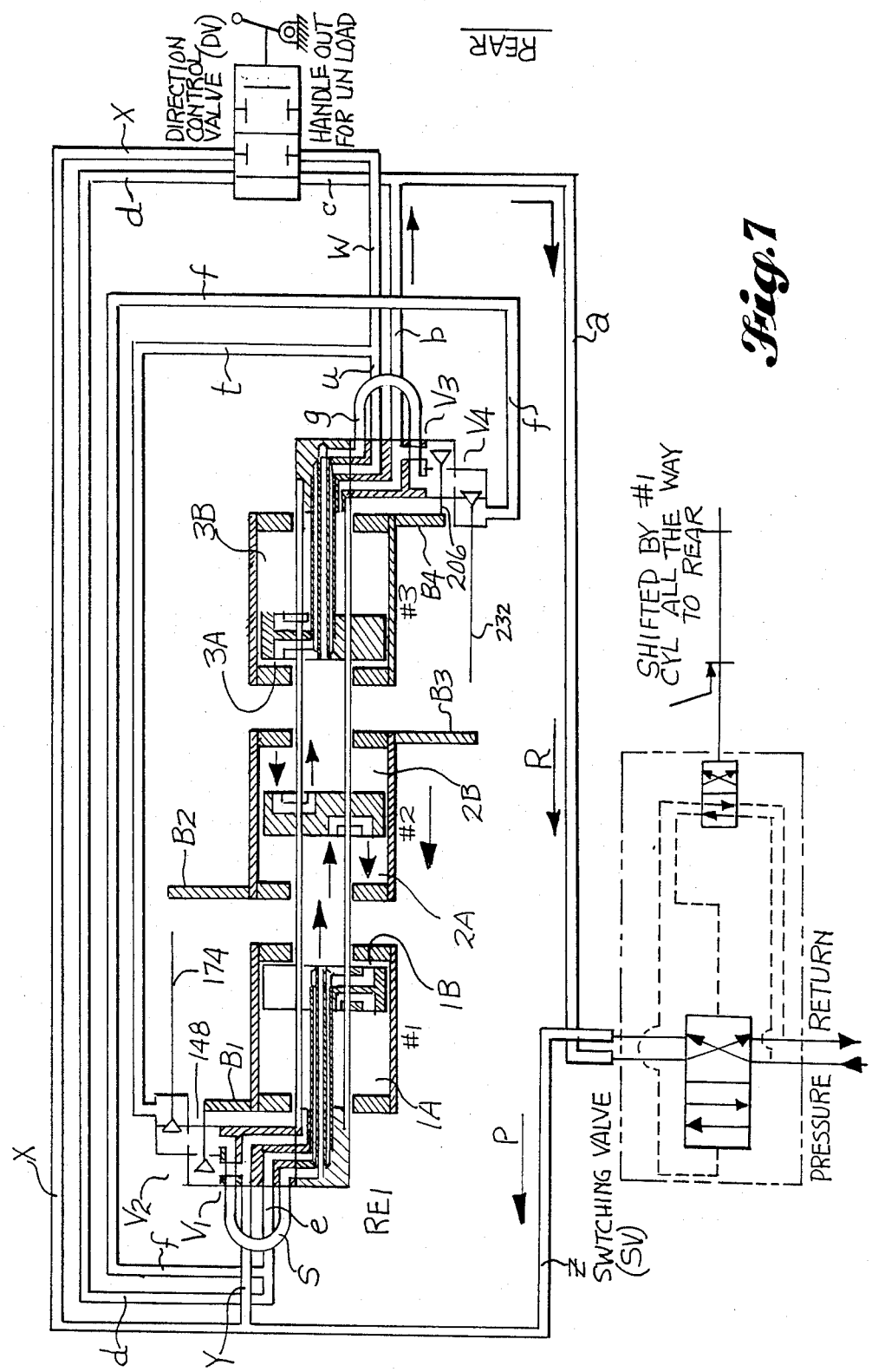
FIG. 7 is a view like FIGS. 5 and 6, but showing the first cylinder in its retracted position, the second cylinder in the process of moving from its advanced to its retracted position, and showing the third cylinder in its advanced position.

Referring to FIG. 7, the opening of valve V1 allows the communication of pressure from conduit section y to conduit section s. This transmits pressure from conduit section s to the fluid delivery and return passageway for working chamber 2A. Specifically, the pressure is communicated via tube 118 to space 124 and then from space 124 to working chamber 2A via porting in the center member C2 and the piston head P2. At the same time, working chamber 2B is communicated with return via porting in piston head P2 and center member C2, and space 126, tube 70, port P2V, conduit section g, valve V3, and conduit sections b and a. In response, cylinder body CB1 moves forwardly into its retracted position. As cylinder body CB2 approaches its forward position the bumper B2 carried by it contacts valve operator 174. This moves the valve operator 174 and the valve plug 166, to the left as illustrated. In this manner valve V2 is moved from a closed position to an open position.

Figure 8:
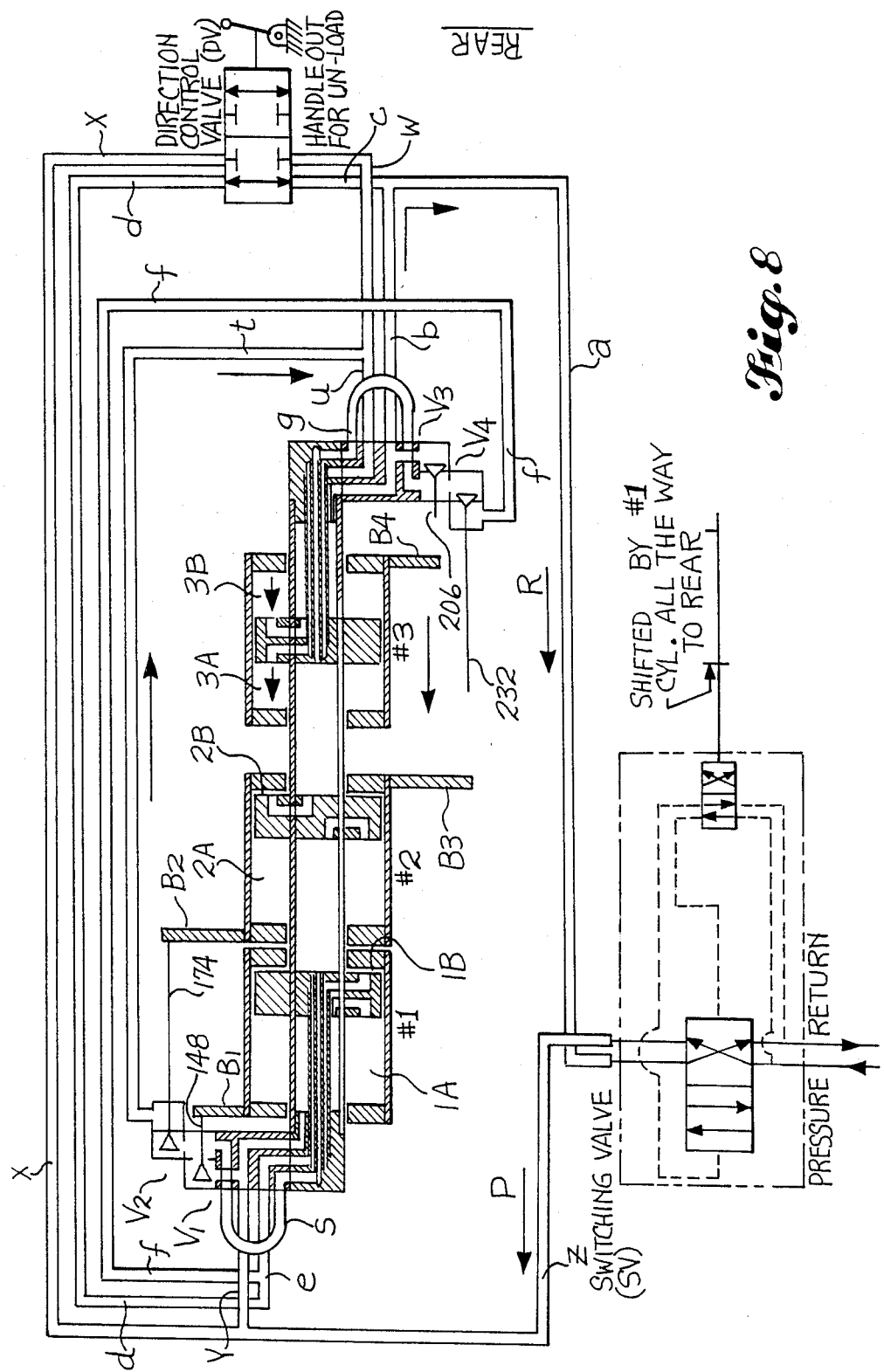
FIG. 8 is a view like FIGS. 5-7 but showing the first and second cylinders in their retracted positions and showing the third cylinder in the process of moving from its advanced position to its retracted position.

Referring to FIG. 8, when valve V2 is open, working chamber 3A is communicated with pressure via porting in the piston head P3 and the center member C3, by the path defined between tubes 66, 70 by port P3A, via conduit section t, by valves V1, V2 and by conduit sections y and z. At the same time, working chamber 3B is communicated with return by ports in piston head P3 and center member C3, by space 128, and port P3V and by line sections b and a.

As previously described, the movement of cylinder body CB3 to its forward position causes a control arm carried by cylinder body CB3 (or by the drive beam 16 connected to it), to contact bumper 248 and shift the pilot valve 242 to the left as illustrated. This causes a movement of the pilot valve spool and a corresponding movement of the main valve spool back into the position shown by FIG. 5. It also causes a reversal of the connection of pressure and return, i.e., pressure from conduit section z to conduit section a and return from conduit section a to conduit section z. In response, the above-described movement of all three cylinder bodies CB1, CB2, CB3 in the conveying direction.

As shown by FIG. 5, in order for all three of the cylinder bodies CB1, CB2, CB3 to move together, in the conveying direction, the working chambers 1A, 2A, 3A must be connected to a return. Chamber 1A is directly connected to return by way of ports in piston head P1 and center member C1, by space 122 and port P1A and by conduit sections y and z. Working chamber 2A is connected to return by way of ports within piston head P2, by center member C2 and space 124, by tube 118 and port P2A, by conduit section s and valve V1, and by conduit sections y and z. Working chamber 3A is connected to return by ports within piston head P3, by center member C3 and the passageway formed between tubes 66 and 70, by port P3A and conduit sections u and t, by valves V2 and V1, and by conduit sections y and z. The flow through valves V1 and V2 occurs by reason of the direction of flow being from the second chamber of each valve V2, V1 to its first chamber. In this direction of flow the hydraulic fluid presses upon the valve plugs, moving them against the biasing springs. The valve plugs are moved into an open position by line pressure and flow occurs through the valves.

Figure 9:
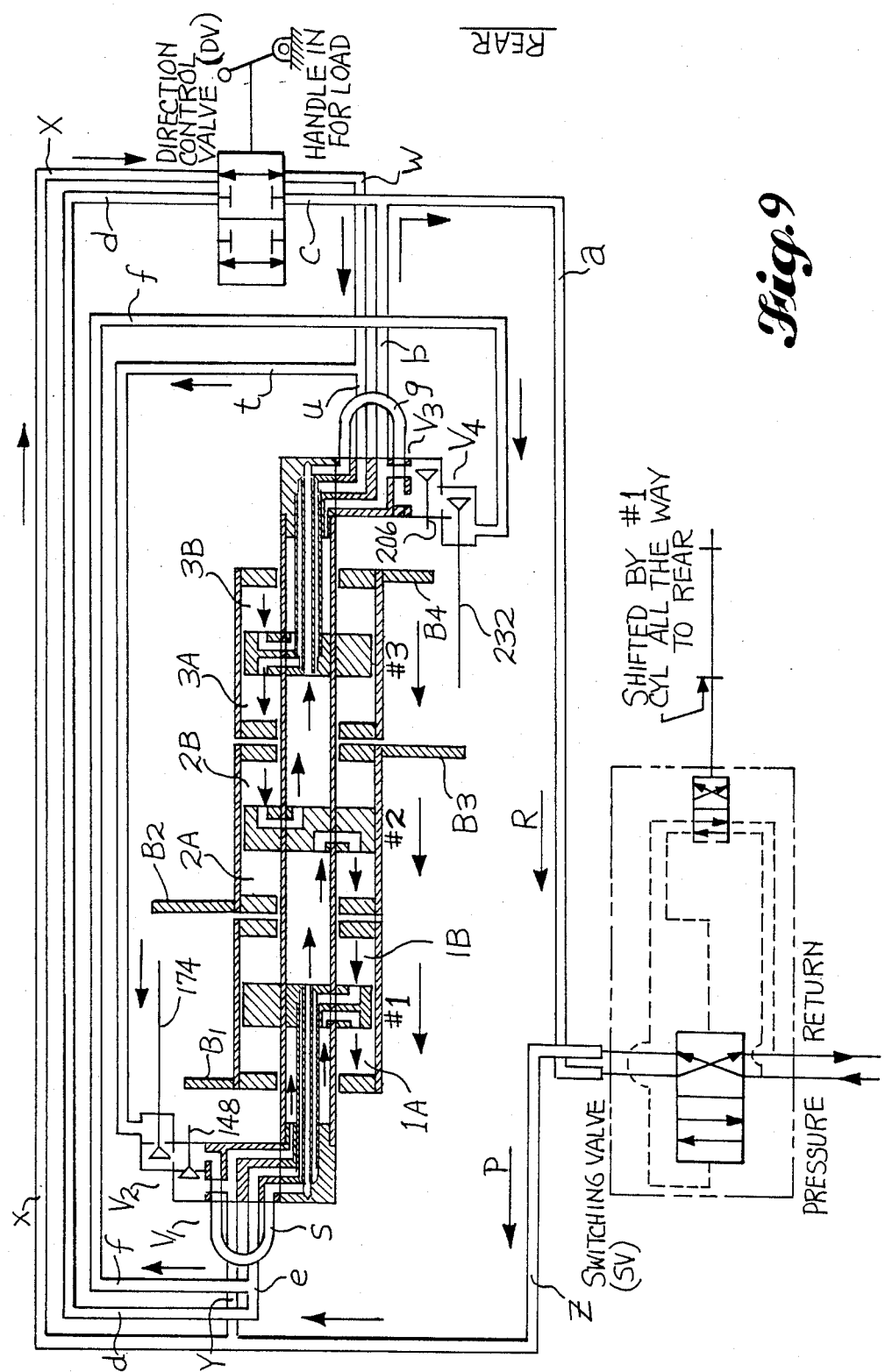
FIG. 9 is a view like FIG. 5, but showing all three of the cylinders being moved together, for conveying a load towards the front of the installation, i.e. in a direction opposite to the conveying direction shown by FIG. 5.
Figure 10:
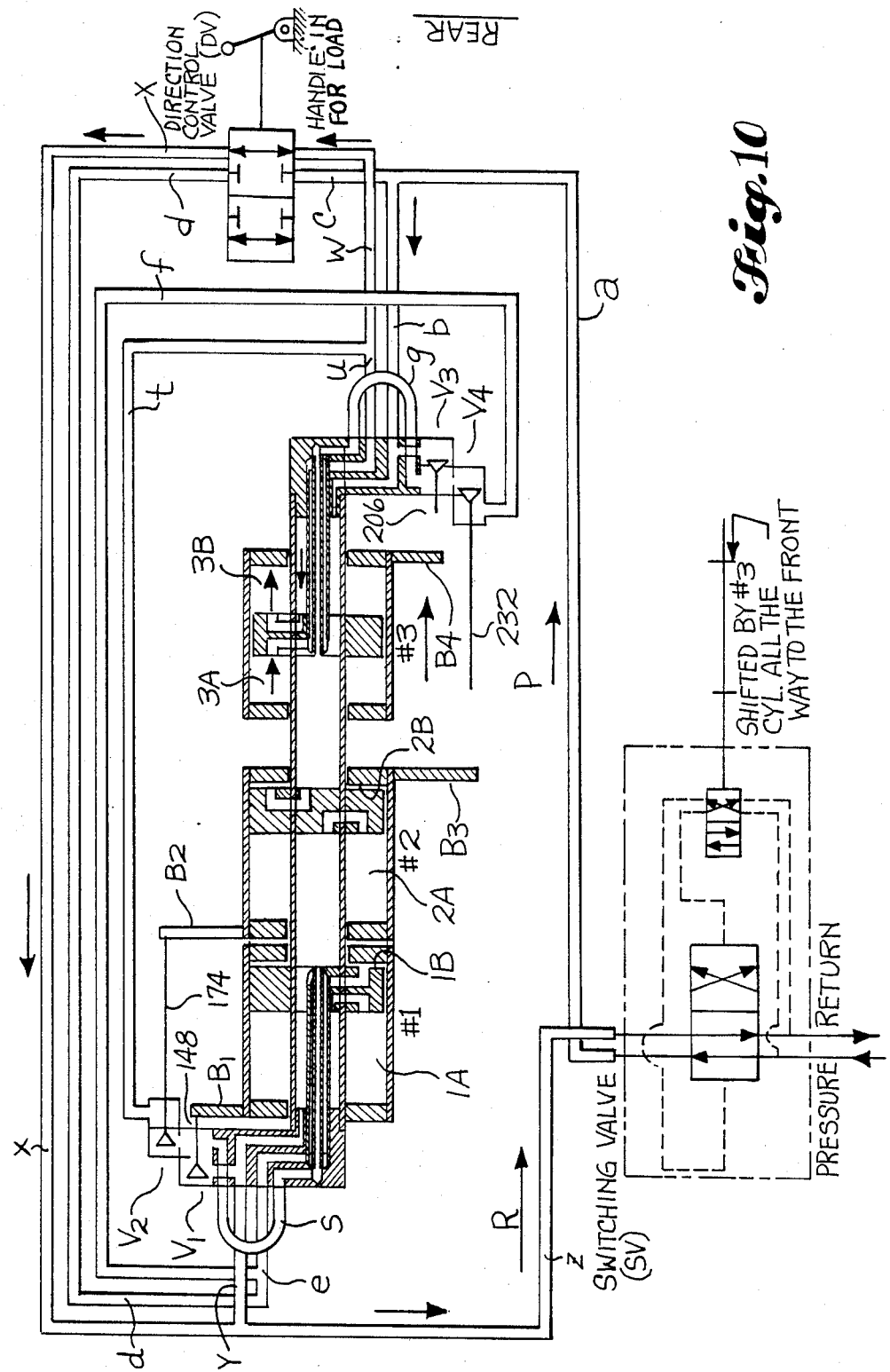
FIG. 10 is a view like FIG. 9, but showing retraction of the third cylinder section towards the rear.
Figure 11:
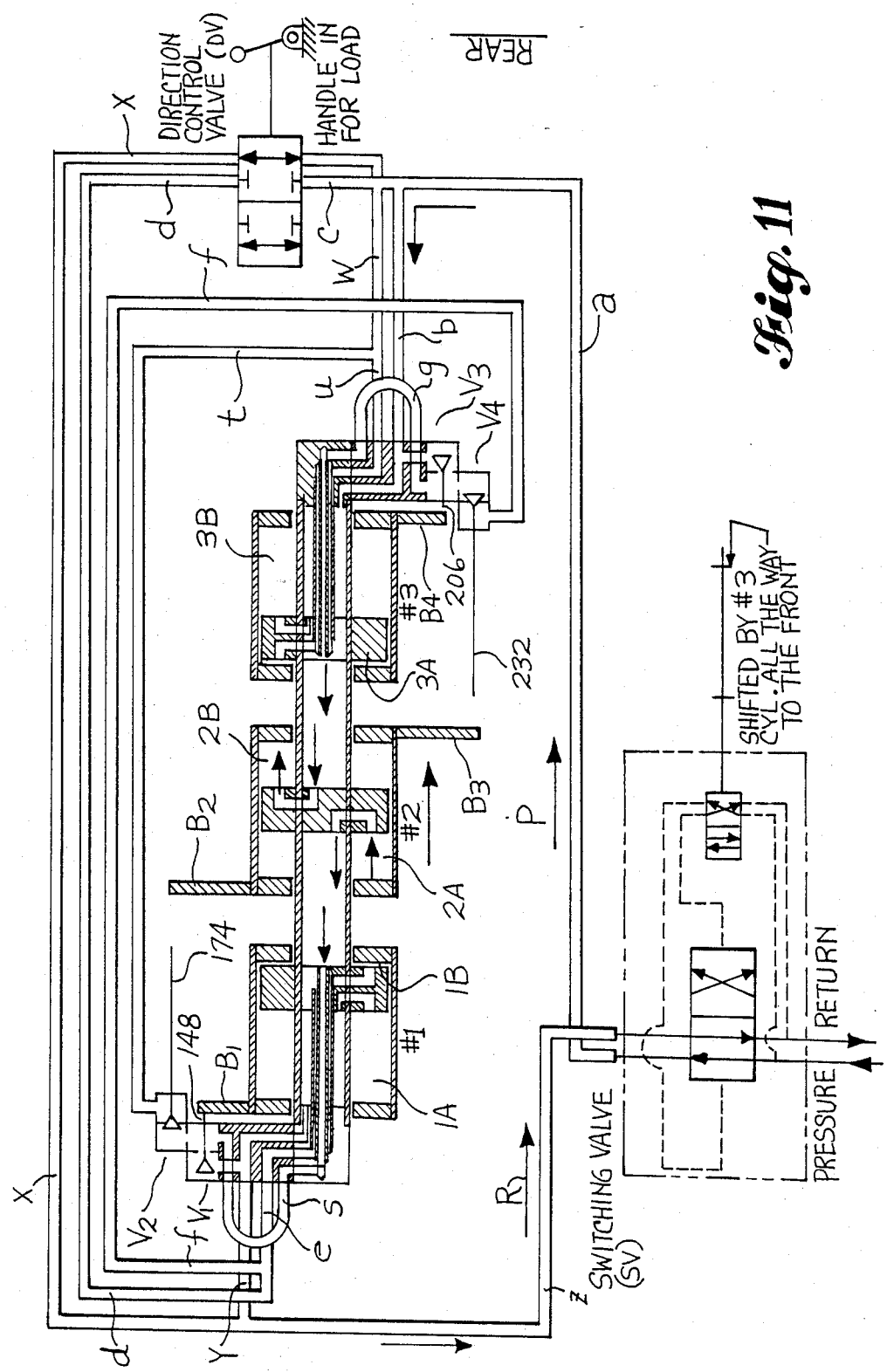
FIG. 11 is a view like FIGS. 9 and 10, but showing retraction of the second cylinder section towards the rear.

FIGS. 9–12 show the direction control valve DV shifted so as to change the conveying direction. FIG. 9 illustrates all three cylinder bodies CB1, CB2, CB3 moving in unison from the rear towards the front of the installation, for conveying a load in that direction. FIGS. 10–12 respectively illustrate the one-at-a-time retraction of cylinder bodies CB3, CB2 and CB1, in that order. The operation of the sequencing valves and the various connections of the working chambers to pressure and return can be determined and understood by an inspection of these views and for that reason the individual steps in the sequence will not be described in detail.

It is to be understood that the illustrated embodiment is presented primarily by way of example. The constructional details and arrangements of many of the parts can vary. For example, a ball and socket connection of the type disclosed in my aforementioned application Ser. No. 333,136 can be provided at one end (e.g. end RE1) of the piston rod R and in such construction the ports P1A, P1B, P2A can be split between the ball and the socket defining member in which the ball is received. Also, the switching valve may be controlled hydraulically rather than mechanically. That is, the bumpers 242, 248 may be replaced by valves which are positioned to be contacted by the control arms carried by the cylinder bodies CB1 and CB3, or by the drive beams 12 and 16 connected thereto. In such embodiment the additional valves serve to control the connection of the main valve spool to pressure and return. Also, the number of drive sections may be decreased or increased. For example, in some installations it may be desirable to have a two section drive unit. In others it may be desirable to have a four section drive unit. Accordingly, the scope of protection is not to be limited by the disclosed examples, but is to be determined solely by the following claims. The claims are to be interpreted in accordance with the established rules of patent claim interpretation, including use of the doctrine of equivalents.

What is claimed is:

1. A hydraulic drive unit, comprising:
   an elongated piston rod having first and second ends;
   a plurality of piston heads spaced apart along the piston rod and fixed in position on the piston rod;
   a cylinder body for each piston head, each said cylinder body being mounted to reciprocate back and forth on said piston rod, relative to its piston head;
   each said piston body and its piston head together defining first and second variable volume fluid chambers, separated by the piston head, with said first fluid chambers being located on a common side of the piston heads and said second fluid chambers being located on a common opposite side of the piston heads; and
   said piston rod including a separate fluid delivery and return passageway for each said variable volume fluid chamber, each said passageway extending from an outer port at one end of the piston rod, through the piston rod, to an inner port communicating with its variable volume fluid chamber.

2. A hydraulic drive unit according to claim 1, comprising three piston heads and three cylinder bodies,
   wherein the piston heads and the cylinder bodies define cylinder sections 1, 2 and 3, positioned in that order between the first and second ends of the piston rod,
   wherein cylinder section 1 comprises piston head 1 and cylinder body 1, cylinder section 2 comprises piston head 2 and cylinder body 2 and cylinder section 3 comprises piston head 3 and cylinder body 3,
   wherein cylinder section 1 includes variable volume chamber 1A on the side of its piston head closest to the first end of the piston rod, and a variable volume chamber 1B on the opposite side of piston head 1, and cylinder section 2 includes a variable volume chamber 2A which is on the side of piston head 2 that is closest to the first end of the piston rod, and a variable volume chamber 2B which is on the opposite side of piston head 2, and cylinder section 3 includes a variable volume chamber 3A which is on the side of piston head 3 that is closest to the first end of the piston rod and a variable volume chamber 3B which is on the opposite side of its piston head 3, and
   wherein the separate fluid delivery and return passageways for three of said variable volume chambers extend into the piston rod from the first end of the piston rod and the separate fluid delivery and return passageways for the remaining three variable volume chambers extend into the piston rod from the second end of the piston rod.

3. A hydraulic drive unit according to claim 2, wherein the separate fluid delivery and return passageways for variable volume chambers 1A, 1B and 2A extend inwardly of the piston rod from the first end of the piston rod, and the separate fluid delivery and return passageways for variable volume chambers 2B, 3A and 3B extend inwardly of the piston rod from the second end of the piston rod.

4. A hydraulic drive unit according to claim 2, wherein the piston rod is tubular and includes a hollow interior, said drive unit further comprising a center member for each cylinder section, each said center member being positioned substantially radially inwardly of its piston head, said center members dividing the hollow interior of the piston rod into four interior spaces, with the first space being located outwardly of the center member for cylinder section 1, towards the first end of the piston rod, and the second space being between the center members for cylinder sections 1 and 2, and the third space being between the center members for the cylinder sections 2 and 3, and the fourth space being outwardly of the center member for the cylinder section 3, towards the second end of the piston rod.

5. A hydraulic drive unit according to claim 4, wherein the fluid delivery and return passageway for variable volume chamber 2A extends from the first end of the piston rod into the second space and from said second space to the variable volume chamber 2A.

6. A hydraulic drive unit according to claim 4, wherein the fluid delivery and return passageway for variable volume chamber 2B extends from the second end of the piston rod into the third space and from such third space to said variable volume chamber 2B.

7. A hydraulic drive unit according to claim 5, wherein the fluid delivery and return passageway for variable volume chamber 2B extends from the second end of the piston rod into the third space and from such third space to said variable volume chamber 2B.

8. A hydraulic drive unit according to claim 5, wherein the piston rod includes a first end member at the first end of the piston rod, and wherein said fluid delivery and return passageway for variable volume chamber 2A comprises a passage tube extending from said first end member to and through the center member for cylinder section 1, said passage tube having an inner end communicating with the second space.

9. A hydraulic drive unit according to claim 8, comprising a second tube concentrically surrounding said passage tube, with the fluid delivery and return passageway for variable volume chamber 1B being defined at least in part by and between said concentric tubes.

10. A hydraulic drive unit according to claim 6, wherein the piston rod includes a second end member at the second end of the piston rod, and wherein said fluid delivery and return passageway for variable volume chamber 2B comprises a passage tube extending from said second end member to and through the center member for cylinder section 3, said passage tube having an inner end communicating with the third space.

11. A hydraulic drive unit according to claim 10, comprising a second tube concentrically surrounding said passage tube, with the fluid delivery and return passageway for variable volume chamber 3A being defined at least in part by and between said concentric tubes.

12. A hydraulic drive unit according to claim 4, wherein the piston rod includes a first end member at the first end of the piston rod, and wherein said fluid delivery and return passageway for variable volume chamber 1A comprises a passageway section extending through said first end member to the first space and a passageway section communicating said first space with said variable volume chamber 1A.

13. A hydraulic drive unit according to claim 4, where the piston rod includes a second end member at the second end of the piston rod, and wherein the delivery and return passageway for variable volume chamber 3B includes a passageway section in said second end member, extending to the fourth space, and a passageway section communicating said fourth space with variable volume chamber 3B.

14. A hydraulic drive unit according to claim 1, comprising three piston heads and three cylinder bodies,
wherein the piston heads and the cylinder bodies define cylinder sections 1, 2 and 3, positioned in that order between the first and second ends of the piston rod,
wherein cylinder section 1 comprises piston head 1 and cylinder body 1, cylinder section 2 comprises piston head 2 and cylinder body 2 and cylinder section 3 comprises piston head 3 and cylinder body 3, and
wherein cylinder section 1 includes variable volume chamber 1A on the side of its piston head closest to the first end of the piston rod, and a variable volume chamber 1B on the opposite side of its piston head, and cylinder section 2 includes a variable volume chamber 2A on the side of its piston head closest to the first end of the piston rod, and a variable volume chamber 2B on the opposite side of its piston head, and cylinder section 3 includes a variable volume chamber 3A on the side of its piston head closest to the first end of the piston rod and a variable volume chamber 3B on the opposite side of its piston head.

15. A hydraulic drive unit according to claim 14, comprising a source of fluid pressure and a return, and fluid delivery and return conduits connected to said separate fluid delivery and return passageways in said piston rod, for delivering fluid pressure from said source to variable volume chambers 1A, 1B and 1C while simultaneously connecting variable volume chambers 1B, 2B and 2C to said return, whereby the cylinder bodies for cylinder sections 1, 2 and 3 are moved in unison from the first end of the piston rod to the second end of the piston rod.

16. A hydraulic drive unit according to claim 15, wherein said fluid delivery and return conduits include a first conduit section extending to the outer port of the fluid delivery and return passageway for variable volume chamber 1A, and a second conduit section extending from the outer port of the fluid delivery and return passageway for variable volume chamber 1B, and means for delivering fluid pressure to the first conduit section while connecting the second conduit section to return, for moving the cylinder body for cylinder section 1 back towards the first end of the piston rod.

17. A hydraulic drive unit according to claim 16, wherein said fluid delivery and return conduits include a third conduit section connected to the outer port of the fluid delivery and return passageway for variable volume chamber 2A, and a fourth conduit section connected to the outer port of the fluid delivery and return passageway for variable volume chamber 2B, for simultaneously communicating variable volume chamber 2B with return, so as to cause movement of the cylinder body for cylinder section 2 back towards the first end of the piston rod.

18. A hydraulic drive unit, according to claim 17, wherein said fluid delivery and return conduits comprise a fifth conduit section connected to the outer port of the fluid delivery and return passageway for variable volume chamber 3A, for communicating the source of fluid pressure with variable volume chamber 3A, and a sixth conduit section connected to the outer port of the fluid delivery and return passageway for variable volume chamber 3B, for simultaneously connecting variable volume chamber 3B with return, to cause movement of the cylinder body for cylinder section 3 back towards the first end of the piston rod.

19. A hydraulic drive unit according to claim 2, wherein the piston rod includes a first end member at the first end of the piston rod and a second end member at the second end of the piston rod, wherein the outer ports for the fluid delivery and return passageways for variable volume chambers 1A, 1B and 2A are in the first end member and the outer ports for the fluid delivery and return passageways for variable volume chambers 2B, 3A and 3B are in the second end member.

20. A hydraulic drive unit according to claim 19, comprising first and second valves at the first end of the piston rod, said first valve comprising wall means defining first and second chambers divided by an inner wall which includes an orifice, said orifice including a valve seat on the first chamber side of the inner wall, a valve plug in the first chamber having a closure surface directed towards the valve seat and a control stem smaller in diameter than said orifice, extending through the orifice into the second chamber, a biasing spring normally biasing the valve plug toward the valve seat and the closure surface into contact with the valve seat, and a mechanical operator in axial alignment with the valve plug, extending from said stem outwardly of the first valve towards cylinder body 1, and positioned to be contacted by cylinder body 1 when cylinder body 1 is moved over to an end position at the first end of the piston rod, said first valve also including a first passageway connecting the outer port of the fluid pressure and return passageway for variable volume chamber 1A to the first chamber of the first valve, and a second passageway connecting the outer port of the fluid delivery and return passageway for variable volume chamber 2A to the second chamber of the first valve,
said second valve comprising wall means defining first and second chambers divided by ,an inner wall which includes an orifice, said orifice including a valve seat on the first chamber side of the inner wall, a valve plug in the first chamber having a closure surface directed towards the valve seat and a control stem smaller in diameter than said orifice extending through the orifice into the second chamber, a biasing spring normally biasing the valve plug towards the valve seat and the closure surface into contact with the valve seat, and a mechanical operator in axial alignment with the valve plug, extending from said stem outwardly of the second valve towards cylinder body 2, and positioned to be contacted by cylinder body 2 when cylinder body 2 is moved over to an end position towards the first end of the piston rod, said first and second valves including a passageway connecting the second chamber of the first valve to the first chamber of the second valve, and said second chamber of said second valve including an inlet-outlet orifice, and said hydraulic drive unit further including a conduit communicating said inlet-outlet orifice with the outer port for the fluid pressure delivery and return passageway for variable volume chamber 3A.

21. A hydraulic drive unit according to claim 20, comprising third and fourth valves at the second end of the piston rod, said third valve comprising wall means defining first and second chambers divided by an inner wall which includes an orifice, said orifice including a valve seat on the first chamber side of the inner wall, a valve plug in the first chamber having a closure surface directed towards the valve seat and a control stem smaller in diameter than said orifice, extending through the orifice into the second chamber, a biasing spring normally biasing the valve plug toward the valve seat and the closure surface into contact with the valve seat, and a mechanical operator in axial alignment with the valve plug, extending from said stem outwardly of the third valve towards cylinder body 3, and positioned to be contacted by cylinder body 3 when cylinder body 3 is moved over to an end position at the second end of the piston rod, said third valve also including a first passageway connecting the outer port of the fluid pressure and return passageway for variable volume chamber 3B to the first chamber of the third valve, and a second passageway connecting the outer port of the fluid delivery and return passageway for variable volume chamber 2B to the second chamber of the third valve, said fourth valve comprising wall means defining first and second chambers divided by an inner wall which includes an orifice, said orifice including a valve seat on the first chamber side of the inner wall, a valve plug in the first chamber having a closure surface directed towards the valve seat and a control stem smaller in diameter than said orifice extending through the orifice into the second chamber, a biasing spring normally biasing the valve plug towards the valve seat and the closure surface into contact with the valve seat, and a mechanical operator in axial alignment with the valve plug, extending from said stem outwardly of the fourth valve towards cylinder body 2, and positioned to be contacted by cylinder body 2 when cylinder body 2 is moved over to an end position towards the second end of the piston rod, said third and fourth valves including a passageway connecting the second chamber of the third valve to the first chamber of the fourth valve, and said second chamber of said fourth valve including an inlet-outlet orifice, and said hydraulic drive unit further including a conduit communicating said inlet-outlet orifice with the outer port for the fluid pressure delivery and return passageway for variable volume chamber 1B.

* * * * *